United States Patent
Lin et al.

(10) Patent No.: US 7,433,581 B2
(45) Date of Patent: Oct. 7, 2008

(54) INTERACTIVE VIDEO PLAYBACK

(75) Inventors: Ken K. Lin, Redwood City, CA (US); Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1150 days.

(21) Appl. No.: 10/159,868

(22) Filed: May 31, 2002

(65) Prior Publication Data
US 2003/0223732 A1 Dec. 4, 2003

(51) Int. Cl.
G06F 3/048 (2006.01)
H04N 7/173 (2006.01)
H04N 5/91 (2006.01)

(52) U.S. Cl. .......... 386/95; 386/46; 386/124; 725/86; 725/110; 715/804; 715/808

(58) Field of Classification Search ............ 725/5, 725/37, 38, 40, 44, 86, 131, 132, 140, 32, 725/51, 110, 35; 386/95; 345/719, 738, 345/762, 854, 720, 744; 715/704, 711, 853, 715/854, 802–805, 719–726; 463/44, 46
See application file for complete search history.

(56) References Cited

U.S. PATENT DOCUMENTS

| | | | |
|---|---|---|---|
| 5,630,006 A * | 5/1997 | Hirayama et al. | 386/92 |
| 6,229,524 B1 * | 5/2001 | Chernock et al. | 345/157 |
| 6,323,858 B1 * | 11/2001 | Gilbert et al. | 345/419 |
| 6,540,615 B2 * | 4/2003 | Tanaka et al. | 463/44 |
| 6,622,306 B1 * | 9/2003 | Kamada | 725/109 |
| 6,701,524 B1 * | 3/2004 | Okamura et al. | 725/37 |
| 6,721,952 B1 * | 4/2004 | Guedalia et al. | 725/38 |
| 6,772,394 B1 * | 8/2004 | Kamada | 715/513 |
| 7,062,712 B2 * | 6/2006 | Schneider et al. | 715/721 |
| 2003/0051228 A1 * | 3/2003 | Martinez et al. | 717/109 |
| 2003/0149983 A1 * | 8/2003 | Markel | 725/51 |

* cited by examiner

*Primary Examiner*—Thai Tran
*Assistant Examiner*—Mishawn Dunn

(57) ABSTRACT

A system for interactive video playback includes a store for holding a set of video streams and an input device for obtaining a set of action inputs. The system includes a video processor that generates the interactive video playback by switching among the video streams in response to the action inputs.

15 Claims, 2 Drawing Sheets

INTERACTIVE VIDEO PLAYBACK

BACKGROUND OF THE INVENTION

1. Field of Invention

The present invention pertains to the field of imaging systems. More particularly, this invention relates to interactive video playback.

2. Art Background

A wide variety of imaging applications including multimedia applications commonly involve user interaction. Examples of such applications include photo realistic computer gaming, remote shopping, and navigation in a real environment, etc.

Prior interactive imaging applications usually employ 3D modeling and computer graphics techniques. Unfortunately, the images generated using such techniques are typically far less than photo realistic. Moreover, such computer graphics techniques are usually time-consuming and expensive and may be incapable of supporting virtual navigation in a real environment.

SUMMARY OF THE INVENTION

A system for interactive video playback is disclosed which may be used to generate a photo realistic interactive environment without the expense of elaborate computer graphics techniques. A system according to the present teachings includes a store for holding a set of video streams, an input device for obtaining a set of action inputs, and a video processor that generates the interactive video playback by switching among the video streams in response to the action inputs.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
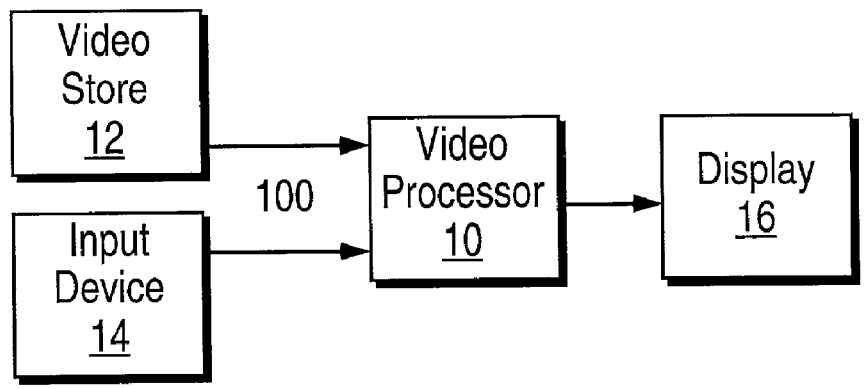
FIG. 1 shows a video system according to the present teachings.

FIG. 1 shows a video system 100 according to the present teachings. The video system 100 includes a video processor 10, a video store 12, an input device 14, and a display 16. The video system 100 provides interactive video by generating a visual playback on the display 16 of video information stored in the video store 12 in a manner that enables a user to decide on the fly, i.e. in real time, which portions of the video information are to be rendered on the display 16. The video system 100 enables a user to select via the input device 14 a video path to follow at specific action hot spots of the rendered video.

In one embodiment, the video system 100 provides free navigation in a photo-realistic virtual environment which is rendered using the display 16. The video information held in the video store 12 may be arranged as a set of video streams. Each video stream includes a sequence of video frames containing digital pixel data from a sampled image scene. The number of video frames in a sequence may be one or more.

Consider a virtual environment example in which the video information in the video store 12 includes a video stream sampled while approaching an intersection, a video stream sampled while turning right from the intersection, a video stream sampled while turning left from the intersection, and a video stream sampled while continuing straight through the intersection. The intersection may be treated as a hot spot and a user via the input device 14 may control whether the video rendered on the display 16 will to go to the left or right or continue straight through the intersection.

In response to user input, the video processor 10 switches among the video streams obtained from the video store 12 when rendering a video on the display 16 in a manner that is relatively seamless to the user. It may seem to the user that a left or right turn or no turn was made when in fact a switch was made among the pre-sampled video streams.

The elements of the video system 100 may be implemented in a combination or hardware/software—for example using a computer system in which the video store 12 is a persistent store, e.g. a disk drive, and the video processor 10 is implemented in software on the computer system. The input device 14 may be any type of input device. Examples include mouse, joysticks, and keyboards. Alternatively, the video system 100 may be implemented as a more specialized system.

Figure 2:
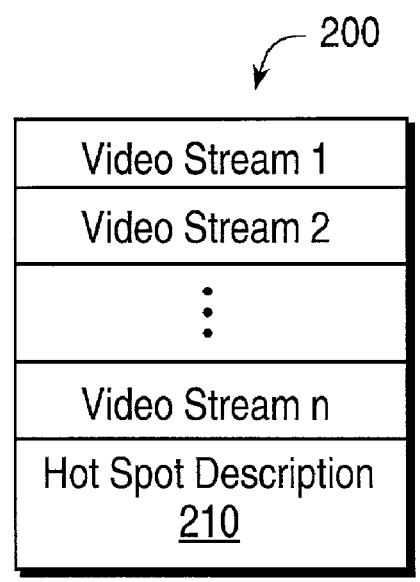
FIG. 2 shows a multimedia format in which video information may be represented according to the present teachings.

FIG. 2 shows a multimedia format 200 in which video information may be represented according to the present teachings. The video information stored in the video store may be represented in the multimedia format 200. The multimedia format 200 includes a set of independent video streams 1-n. Each video stream 1-n includes a sequence of video frames each having an array of digital pixel data. The video streams 1-n may be compressed.

The multimedia format 200 includes a hot spot description 210. The hot spot description 210 specifies one or more action hot spots carried by the video streams 1-n. The hot spot description 210 determines where switches between video streams 1-n may occur, how the switches are to occur, and what action by a user are to cause switches among the video streams 1-n. In one embodiment, the hot spot description 210 is in XML format.

The description of the user actions and hot spots contained in the hot spot description 210 may have any arrangement. The video system 100 may provide a user interface, for example using the display 16 and the input device 14 and related software, that translates between the actions listed in the hot spot description 210 and real user actions.

For example, the hot spot description 210 may describe abstract actions such as LEFT, RIGHT, TURNBACK, UP, DOWN, etc., while the user interface of the video system 100 translate actions such as a left mouse button click to LEFT, the right mouse button click to RIGHT, etc.

If the video streams 1-n are compressed then the compression format should be one that enables seek, decode and playback from arbitrary points in the video streams 1-n. This may be realized by a compression format that provides indexing. The indexing may be based, for example on byte-position from the start of a video stream, or elapsed time from the start of the video stream using time-stamps included in the compression format.

Examples of compression formats include standardized MPEG-1/2/4 streams, as well as other suitable formats. In the case of MPEG type encoding, a seek to an arbitrary position in a video stream involves a seek to the first INTRA video frame after a specified byte-offset or time-stamp. This is because decoding of video frames cannot start before the next INTRA video frame due to the use of inter-video frame prediction.

Each independent video stream 1-n is associated with a set of action hot spots specified in the hot stop description 210. The overall interaction description for the environment is the collection of action hot spots from all of the video streams 1-n put together. An action hot spot defines where, how, and in response to which action to switch the current playback stream to another one in the same environment.

For example, an action hot spot for the video stream n may be defined by (1) a starting index position within the video stream n for the hot spot, (2) an ending index position within the video stream n for the hot spot, (3) a specification of an action that triggers a switch from the video stream n, (4) an identifier of the new video stream 1-n to which playback is to be switched, (5) a starting index position within the new video stream 1-n, and (6) an ending index position within new video stream 1-n.

The index range specified by the starting and ending index positions within the video stream n (items 1 and 2) determines the temporal range where the hot spots are active when the video stream n is the one currently playing. The specification of an action that triggers a switch from the video stream n (item 3) describes the action, for example LEFT, RIGHT etc., which triggers the switch. The identifier of the new video stream 1-n to which playback is to be switched (item 4) identifies the video stream 1-n to switch playback to if the action described in the specification of an action is made by a user within the time specified by the index range (items 1 and 2).

The starting index position and the ending index position within the new video stream 1-n (items 5 and 6) describe the temporal range in the new video from which playback starts in the new video. This range may be interpreted by starting playback of the new video at a point within this range, where it cuts the same ratio as the time of the actual action within the source hot spot range given by items 1 and 2. For example, if a user performs the described action a third of the way into the source range given by items 1 and 2, then the video processor 10 switches playback to the new video at a point which is also a third of the way in the destination range given by items 5 and 6.

One feature of this type of hot spot representation is that while item 2 may be greater than or equal to item 1, item 6 may be either greater than or less than item 5. If item 6 is less than item 5, then actions such as turning back may be simulated with only two video streams, one going forward, and the other going backward along the same path. Hot spots for the same actions in the same video stream are non-overlapping but may overlap for different actions.

Figure 3:
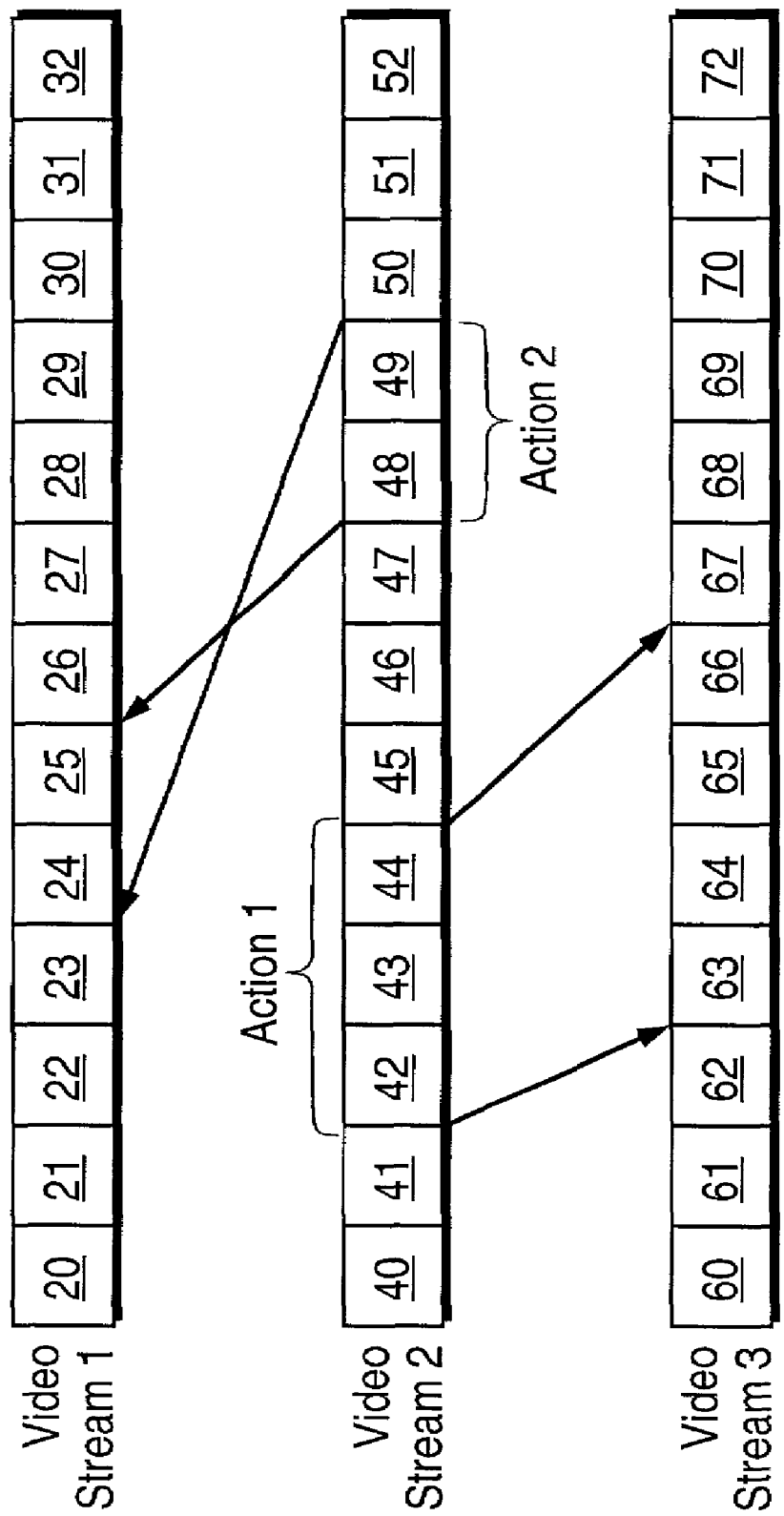
FIG. 3 illustrates the function of hot spots according to the present teachings.

FIG. 3 illustrates the function of hot spots according to the present teachings. An action hot spot that includes frames 42-44 of the video stream 2 and an action hot spot that includes frames 48-49 of the video stream 2 are shown for a given currently playing video.

If a certain action (Action 1) is performed by a user via the input device 14 within a temporal range that includes the frames 42-44 of the video stream 2 while the source video is playing, then the video processor 10 switches playback to the video stream 3 in a range that includes the video frames 63-66. The actual point where playback commences in the video stream 3 is determined by when the action actually happened within the range of Action 1. The actual playback switch position for Action 1 is directly proportional in the destination range, frames 63-66 of the video stream 3, to the actual action time in the source range, frames 42-44 of the video stream 2.

If Action 2 is performed by a user via the input device 14 within a temporal range that includes the frames 48-49 of the video stream 2 while the source video is playing, then the video processor 10 switches playback to the video stream 1 in a range that includes the video frames 24-25. The actual playback switch position for Action 2 is directly proportional in the destination range, frames 24-25 of the video stream 1, to the actual action time in the source range, frames 48-49 of the video stream 2 but with a negative sign.

Alternatively, the actual playback switch position for either Action 1 and/or Action 2 may be specified on the corresponding hot spot description.

The above techniques provide a user-friendly interface for processing and switching video streams with the appropriate definition of action hot spots. These techniques simulate free navigation in a realistic environment created with real videos.

In addition to the navigational action hot spots that cause video switch, other action hot spots that provide other information regarding the environment may be defined. For example, an action INFO may cause certain informative messages or images to be displayed in a separate window on the display 16, thereby providing a user more information about the scene currently undergoing playback.

The above techniques provide a general video framework that may be applicable to a variety of multimedia applications including photo realistic computer gaming, remote shopping, and navigation in a real environment, etc. These techniques provide a foundation on which photo realistic interactive environments may be built. These techniques enable virtual navigation in a real-world environment for which videos have been captured. The created environment is not entirely virtual, but exists in reality, thus bridging an important gap between virtual and real worlds.

For example, a retail store that has both real and online presence may allow online customers to shop navigating in the same real environment as the real store without the expense otherwise required to model the store accurately. The present techniques only require a reasonable number of video shots along the aisles and hallways which are then connected using the action hot spot definitions.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for interactive video playback for generating a photo realistic interactive environment, comprising:
   store for holding a set of video streams including a first and a second and a third video stream;
   hot spot description that specifies an action hot spot in the first video stream and that associates a frame location in the second video stream to a first action input and a frame location in the third video stream to a second action input;
   video processor that generates a video playback by playing the first video stream for a display area and switching to the frame location in the second video stream by playing from the frame location in the second video stream for the same display area if a user provides the first action input during the action hot spot and switching to the frame location in the third video stream by playing from the frame location in the third video stream for the same display area if the user provides the second action input during the action hot spot.

2. The system of claim 1, wherein the first and second action inputs indicate different directions with respect to a virtual environment depicted by the first video stream.

3. The system of claim 1, further comprising an input device that enables the user to provide the action input.

4. The system of claim 1, wherein the hot spot description includes a starting and an ending index position in the first video stream for the action hot spot.

5. The system of claim 1, wherein the hot spot description specifies the frame location in the second video stream with a starting and an ending index position in the second video stream.

6. The system of claim 5, wherein the video processor switches to a video frame in the second video stream between the starting and ending index positions which is proportional to a frame location in the first video stream during the action hot spot at which the first action input occurred.

7. The system of claim 1, wherein the hot spot description specifies the frame location in the third video stream with a starting and an ending index position in the third video stream.

8. The system of claim 7, wherein the video processor switches to a video frame in the third video stream between the starting and ending index positions which is proportional to a frame location in the first video stream during the action hot spot at which the second action input occurred.

9. A method for interactive video playback for generating a photo realistic interactive environment, comprising:
    storing a set of video streams including a first and a second and a third video stream;
    specifying an action hot spot in the first video stream and associating a frame location in the second video stream to a first action input and associating a frame location in the third video stream to a second action input;
    generating a video playback by playing the first video stream for a display area and switching to the frame location in the second video stream by playing from the frame location in the second video stream for the same display area if a user provides the first action input during the action hot spot and switching to the frame location in the third video stream by playing from the frame location in the third video stream for the same display area if the user provides the second action input during the action hot spot.

10. The method of claim 9, wherein the first and second action inputs indicate different directions with respect to a virtual environment depicted by the first video stream.

11. The method of claim 9, wherein specifying an action hot spot comprises specifying a starting and an ending index position in the first video stream for the action hot spot.

12. The method of claim 9, wherein associating a frame location in the second video stream comprises associating a starting and an ending index position in the second video stream to the first action input.

13. The method of claim 12, wherein switching to the frame location in the second video stream comprises switching to a video frame in the second video stream between the starting and ending index positions which is proportional to a frame location in the first video stream during the action hot spot at which the first action input occurred.

14. The method of claim 9, wherein associating a frame location in the third video stream comprises associating a starting and an ending index position in the third video stream .to the second action input.

15. The method of claim 14, wherein switching to the frame location in the third video stream comprises switching to a video frame in the third video stream between the starting and ending index positions which is proportional to a frame location in the first video stream during the action hot spot at which the second action input occurred.

* * * * *